(12) United States Patent
Uchida

(10) Patent No.: US 7,856,124 B2
(45) Date of Patent: Dec. 21, 2010

(54) IMAGE EVALUATION DEVICE, METHOD AND PROGRAM

(75) Inventor: Mitsuhiro Uchida, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1015 days.

(21) Appl. No.: 11/652,005

(22) Filed: Jan. 11, 2007

(65) Prior Publication Data

US 2007/0160268 A1      Jul. 12, 2007

(30) Foreign Application Priority Data

Jan. 11, 2006   (JP)   ............................. 2006-003269

(51) Int. Cl.
*G06K 9/00*   (2006.01)

(52) U.S. Cl. ..................................... 382/118

(58) Field of Classification Search ........................ None
See application file for complete search history.

(56) References Cited

U.S. PATENT DOCUMENTS

| | | | |
|---|---|---|---|
| 6,282,317 B1 * | 8/2001 | Luo et al. ................... | 382/203 |
| 6,847,733 B2 * | 1/2005 | Savakis et al. .............. | 382/225 |
| 7,269,292 B2 * | 9/2007 | Steinberg .................... | 382/243 |
| 7,298,412 B2 * | 11/2007 | Sannoh et al. .............. | 348/348 |
| 2002/0181784 A1 * | 12/2002 | Shiratani .................... | 382/218 |
| 2003/0048950 A1 * | 3/2003 | Savakis et al. .............. | 382/225 |
| 2007/0174272 A1 * | 7/2007 | Carter et al. .................. | 707/5 |

FOREIGN PATENT DOCUMENTS

| | | |
|---|---|---|
| JP | 2002-10179 A | 1/2002 |
| JP | 2004-361989 A | 12/2004 |
| JP | 2005-227957 A | 8/2005 |

\* cited by examiner

*Primary Examiner*—Yuzhen Ge
(74) *Attorney, Agent, or Firm*—Birch, Stewart, Kolasch & Birch, LLP

(57) ABSTRACT

More accurate image evaluation is achieved by using information about faces contained in images. An information acquiring unit acquires, from an image containing at least one face, information about the size and the position of the at least one face. An evaluation value calculating unit calculates an evaluation value representing a result of evaluation of the image based on the information about the size and position of the at least one face acquired by the information acquiring unit.

6 Claims, 12 Drawing Sheets

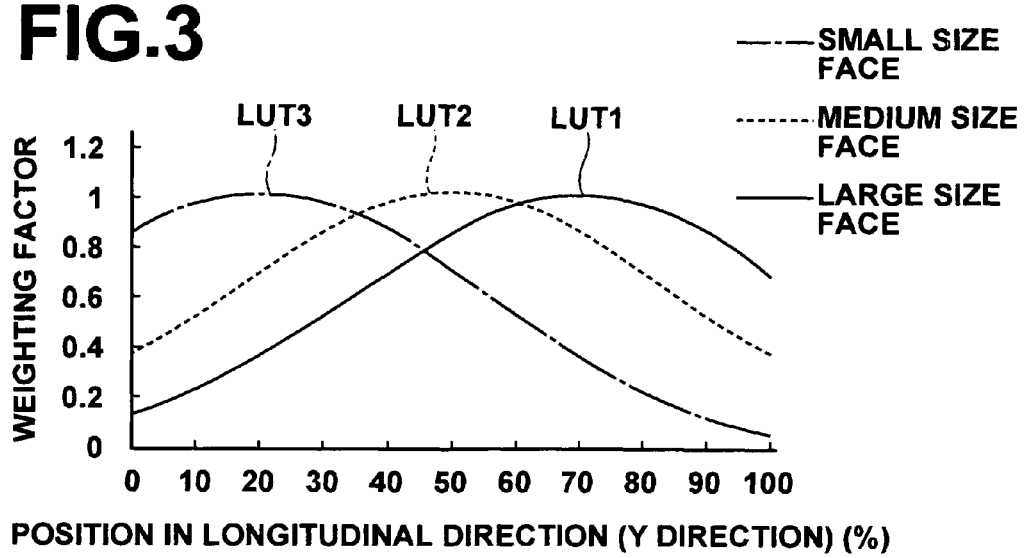
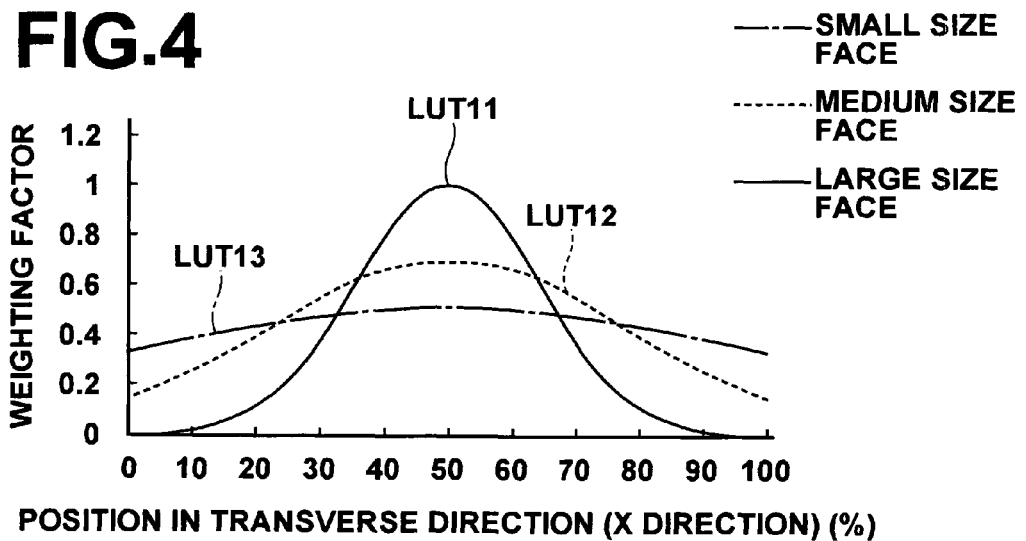

IMAGE EVALUATION DEVICE, METHOD AND PROGRAM

BACKGROUND OF THE INVENTION

1. Field of the Invention

The present invention relates to an image evaluation device and an image evaluation method for evaluating images based on faces contained in the images, and a program for causing a computer to carry out the image evaluation method.

2. Description of the Related Art

With widespread use of digital cameras and significant increase in capacity of recording media for storing images in recent years, users can store a lot of images in a single medium. However, it is troublesome for users to select an image(s) to be processed (to be printed, for example) from a large number of images. Therefore, in order to efficiently select such images, functions are demanded, such as for refining candidate images with certain conditions before users finally determine images to be printed and/or for selecting images that are suitable to be printed according to user's taste based on evaluation of images.

For example, Japanese Unexamined Patent Publication No. 2002-010179 discloses an approach in which images are evaluated based on any of lightness of the images, acceleration sensor values and AF evaluation, and pictures that are unsuitable to be printed are automatically excluded based on the results of the evaluation.

Further, Japanese Unexamined Patent Publication No. 2004-361989 discloses an approach in which the orientation of a human face contained in each image is determined, an evaluation value for each image is calculated based on the determined orientation, and a desired image is selected from a plurality of images based on the calculated evaluation values.

Furthermore, U.S. Patent Application Publication No. 20020181784 discloses an approach in which images are evaluated using results of total evaluation with respect to a plurality of evaluation items such as a ratio of a face in an image, whether eyes are open or shut, the orientation of a face, focus, blurring, lightness and the like.

As described above, various approaches have been proposed for evaluating images based on faces contained in the images. However, the approaches described in the above-mentioned patent documents simply calculate evaluation values with respect to evaluation items to evaluate images. Therefore, their results not always reflect subjective evaluation by actual viewers of the images, and the evaluation by the actual viewers may differ from the calculated evaluation of the images.

SUMMARY OF THE INVENTION

In view of the above-described circumstances, the present invention is directed to provide more accurate evaluation of images using information about faces contained in the images.

An image evaluation device according to the invention comprises: an information acquiring means for acquiring, from an image containing at least one face, information about the size and the position of a face of interest of the at least one face; and an evaluation value calculating means for statistically calculating an evaluation value representing a result of evaluation of the image based on the information about the size and the position of the face of interest.

Specifically, the evaluation value calculating means may reference a first weighting function that has been determined in advance according to various sizes and positions of faces in images, and calculate, as the evaluation value, a first weighting factor obtained from the first weighting function based on the information about the size and the position of the face of interest.

The term "evaluation value" herein is not a value that can be quantitatively calculated from an image, such as a signal-to-noise ratio or a resolution, but means an estimated value that is calculated so as to have a correlation with a possible evaluation level by a user who wants the evaluation of the image.

The term "statistically" herein means that the weighting function for calculating the evaluation value is inductively found by using, as correct solution data, images selected as "being preferable" from a lot of sample images, and this is unlike to deductively find the weighting function based on some assumptions. It should be noted that the correct solution data may be selected in any manner, and the correct solution data obtained through actual selection of images by evaluators can be used. The number of sample images for finding the weighting function may be 300 or more, or optionally 1000 or more.

In the image evaluation device according to the invention, the information acquiring means may comprise means for acquiring information about the number of the at least one face, and the evaluation value calculating means may comprise means for calculating the evaluation value based on the information about the number of the at least one face.

In this case, the evaluation value calculating means may reference a second weighting function that has been determined in advance according to various numbers of faces in images, and obtain a second weighting factor from the second weighting function based on the information about the number of the at least one face. Then, the evaluation value calculating means may further weight the first weighting factor for each face of interest with the second weighting factor to calculate a temporary evaluation value for each face of interest, and sum up the temporary evaluation values for all the faces in the image to calculate the evaluation value.

Alternatively, the evaluation value calculating means may reference a third weighting function that has been determined in advance according to various sizes and numbers of faces in images, and obtain a third weighting factor from the third weighting function based on the information about the number of the at least one face and the information about the size of the face of interest. Then, the evaluation value calculating means may further weight the first weighting factor for each face of interest with the third weighting factor to calculate a temporary evaluation value for each face of interest, and sum up the temporary evaluation values for all the faces in the image to calculate the evaluation value.

In the image evaluation device according to the invention, the information acquiring means may comprise means for acquiring information about a distance to the face of interest contained in the image from a face nearest to the center of the image, and the evaluation value calculating means may comprise means for calculating the evaluation value based on the information about the distance.

In this case, the evaluation value calculating means may reference a fourth weighting function that has been determined in advance according to various positions of faces in images, and obtain a fourth weighting factor from the fourth weighting function based on the information about the distance. Then, the evaluation value calculating means may further weight the first weighting factor or the temporary evaluation value according to the distance from the face nearest to the center of the image, and output the weighted first weighting factor as the evaluation value, or sum up the weighted temporary evaluation values for all the faces in the image to yield the evaluation value.

In the image evaluation device according to the invention, the information acquiring means may comprise means for acquiring information about the orientation of the face of interest, and the evaluation value calculating means may comprise means for calculating the evaluation value based on the information about the orientation of the face of interest.

In this case, the evaluation value calculating means may reference a fifth weighting function that has been determined in advance according to various orientations of faces in images, and obtain a fifth weighting factor from the fifth weighting function based on the information about the orientation of the face of interest. Then, the evaluation value calculating means may further weight the first weighting factor, the temporary evaluation value or the weighted first weighting factor, which has been weighted with the fourth weighting factor, with the fifth weighting factor, and output the weighted first weighting factor or the weighted first weighting factor, which has already been weighted with the fourth weighting factor and further weighted with the fifth weighting factor, as the evaluation value, or sum up the weighted temporary evaluation values calculated for all the faces to yield the evaluation value.

An image evaluation method according to the invention comprises the steps of: acquiring, from an image containing at least one face, information about the size and the position of a face of interest of the at least one face; and statistically calculating an evaluation value representing a result of evaluation of the image based on the information about the size and the position of the face of interest.

It should be noted that the image evaluation method according to the invention may be provided as a program for causing a computer to carry out the method.

BRIEF DESCRIPTION OF THE DRAWINGS

FIG. 3 illustrates weighting tables with respect to sizes and positions (in the y-direction) of faces;

FIG. 4 illustrates weighting tables with respect to sizes and positions (in the x-direction) of faces;

DESCRIPTION OF THE PREFERRED EMBODIMENTS

Figure 1:
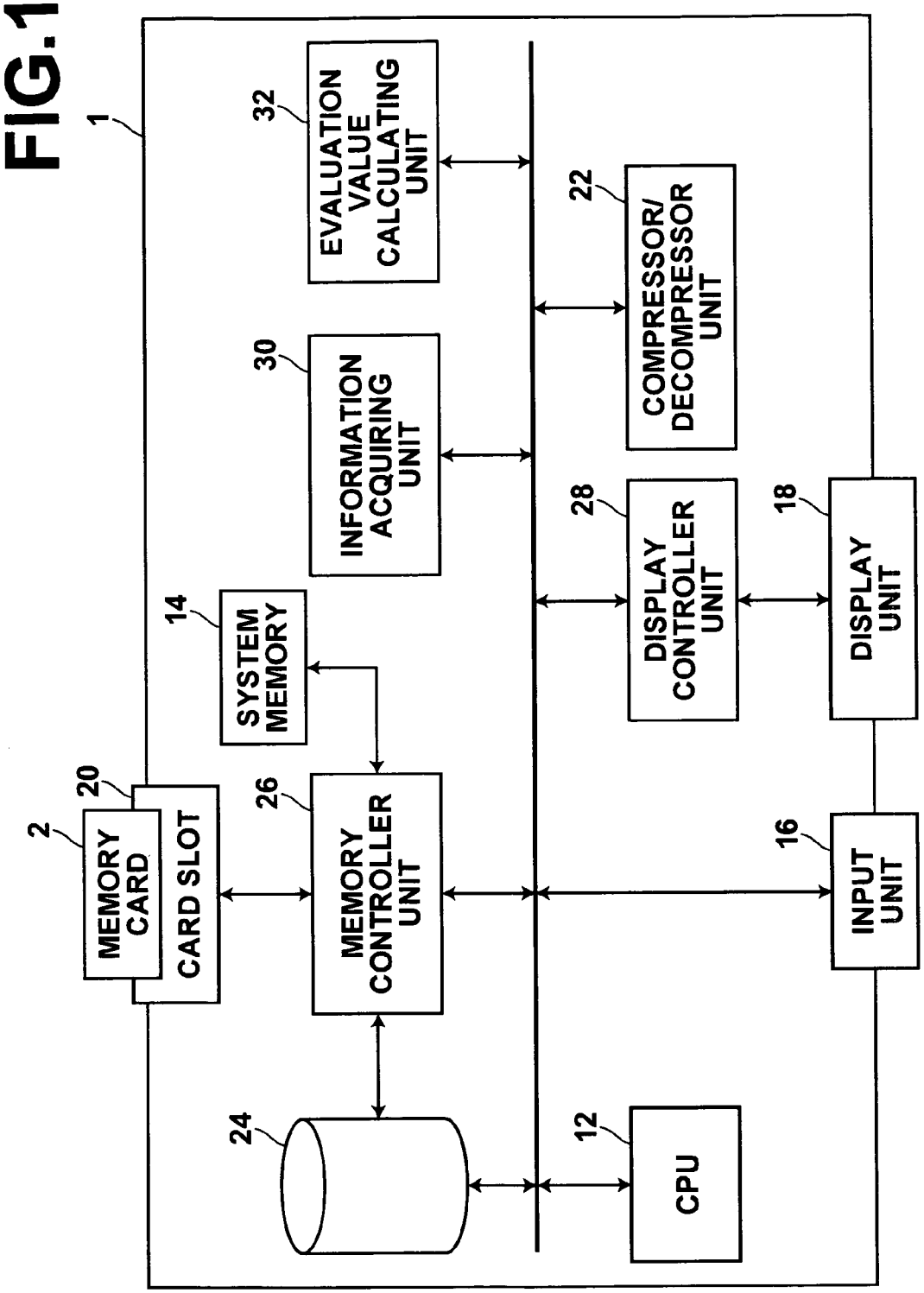
FIG. 1 is a schematic block diagram illustrating the configuration of an image evaluation device according to exemplary embodiment of the present invention.

Hereinafter, embodiments of the present invention will be described with reference to the drawings. FIG. 1 is a schematic block diagram illustrating the configuration of an image evaluation device according to the embodiment of the invention. As shown in FIG. 1, the image evaluation device 1 according to the present embodiment includes: a CPU 12 for exerting various controls such as image data recording control and display control as well as for controlling various components forming the device 1; a system memory 14 formed by a ROM that stores programs for operating the CPU 12, a viewer software for viewing images and various constants, and a RAM that serves as a work space for the CPU 12 carrying out processes; an input unit 16 formed, for example, by a keyboard and a mouse for inputting various instructions to the device 1; and a display unit 18 formed, for example, by a liquid crystal display monitor for displaying various screens.

The image evaluation device 1 further includes: a card slot 20 for reading image data recorded in a memory card 2 or recording image data in the memory card 2; a compressor/decompressor unit 22 for compressing image data and decompressing compressed image data according to an image compression scheme such as JPEG; a hard disk 24 for storing image data, various programs executed by the CPU 12 and statistically obtained weighting tables as described later; a memory controller unit 26 for controlling the system memory 14, the card slot 20 and the hard disk 24; and a display controller unit 28 for controlling display on the display unit 18.

The image evaluation device 1 further includes an information acquiring unit 30 for acquiring information about faces from images, and an evaluation value calculating unit 32 for calculating evaluation values that represent results of evaluation of the images based on the information acquired by the information acquiring unit 30.

Now, functions of the information acquiring unit 30 and the evaluation value calculating unit 32 are described in conjunction with processes carried out in this embodiment, it should be noted that, in the following explanation, the images have been retrieved from the memory card 2 and stored on the hard disk 24.

Figure 2:
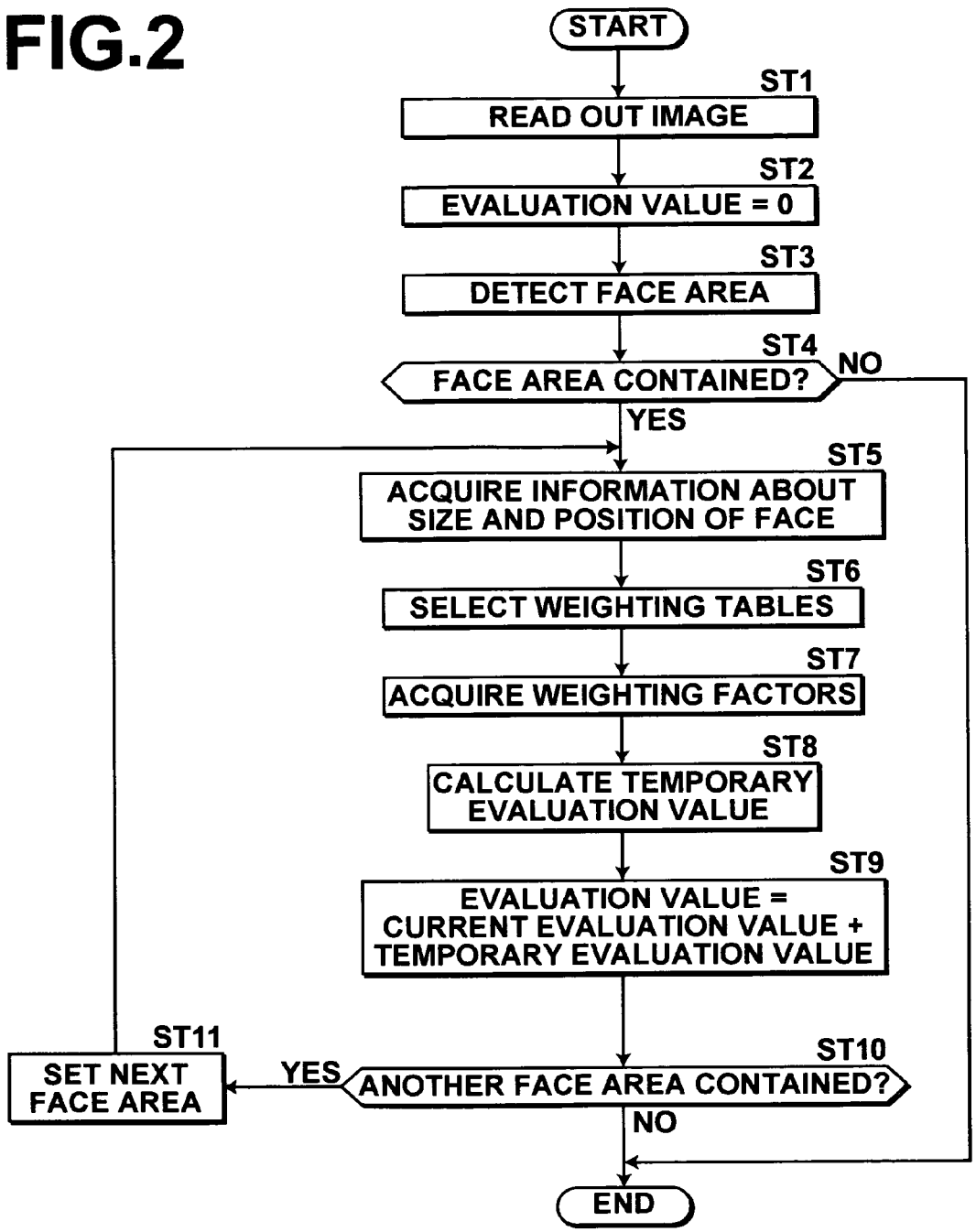
FIG. 2 is a flow chart of an image evaluation process carried out in a first embodiment of the invention.

FIG. 2 is a flow chart of an image evaluation process carried out in a first embodiment of the invention. In the first embodiment, evaluation values are calculated based on information about sizes and positions of faces. The CPU 12 starts the process when a user has inputted an instruction for starting evaluation of the images through the input unit 16. First, an image is read from the hard disk 24 (step ST1), and an initial value of 0 is set for the evaluation value (evaluation value=0, step ST2). Then, the information acquiring unit 30 detects a human face area in the image (step ST3). Specifically, the information acquiring unit 30 detects as the face area a rectangular area that contains the flesh color and surrounds an outline of a face in the image, for example. It should be noted that an area corresponding to the outline of the face may be detected as the face area. Further, the technique for detecting the face area is not limited to the one described above. If there are a plurality of faces contained in the image, face areas for all the faces are detected.

Subsequently, the information acquiring unit 30 determines whether or not the image contains a face area (step ST4). If the determination in step ST4 is negative, the process ends. On the other hand, if the determination in step ST4 is affirmative, information about the size and the position of the face of interest contained in the image is acquired from the detected face area (step ST5). It should be noted that, as the size of the face, the number of pixels within the face area and/or a ratio of the face area to the entire image can be used.

In the information about the size of the face, the size of the face area is represented by one of three levels including Large, Medium and Small. Specifically, two threshold values Th1 and Th2 (Th1<Th2) are set in advance, and the size of the face is determined, such that the size of the face=Small if the size of the face area≦Th1, the size of the face=Medium if Th1<the size of the face area≦Th2, or the size of the face=Large if Th2<the size of the face area.

In the information about the position of the face, the position of the face is represented by percentage values of ratios of coordinate values at the center of the face area (for example, at the intersection of diagonals if the face area is rectangular) to the transverse and longitudinal lengths of the image. It should be noted that, the x-axis for the coordinate is in the transverse direction and the y-axis is in the longitudinal direction of the image placed in landscape orientation (in which the transverse length is longer than the longitudinal length). If the length of the image in the x-direction is 100 and the length in the y-direction is 50 and the coordinates at the center of the face area is (30,25), the information about the position of the face is expressed as (30,50).

In the first embodiment, weighting tables that have been determined in advance according to different sizes and positions of faces are stored in the hard disk. FIGS. 3 and 4 illustrate the weighting tables with respect to different sizes and positions of faces. It should be noted that the weighting tables LUT1 to LUT3 and LUT11 to LUT13 are determined based on a test where each of a number of evaluators selects sample images that are preferable to him or her from a lot of sample images containing various sizes and positions of faces, and the weighting factors represent ratios of the numbers of evaluators who selected the respective sample images to the total number of evaluators. In the weighting tables LUT1 to LUT3 and LUT11 to LUT13, the weighting factors are normalized by assigning the weighting factor of 1 to the sample image selected by the largest number of evaluators. As shown in FIG. 3, in the weighting tables LUT1 to LUT3 for the Large, Medium and Small size faces, the information about the longitudinal (y-directional) positions are plotted along the abscissa axis and the weighting factors are plotted along the ordinate axis. Further, as shown in FIG. 4, in the weighting tables LUT11 to LUT13 for the Large, Medium and Small size faces, the information about transverse (x-directional) positions are plotted along the abscissa axis and the weighting factors are plotted along the ordinate axis.

Then, the evaluation value calculating unit 32 selects weighting tables from the weighting tables LUT1 to LUT3 and LUT11 to LUT13 according to the size of the face of interest (step ST6).

Figure 5:
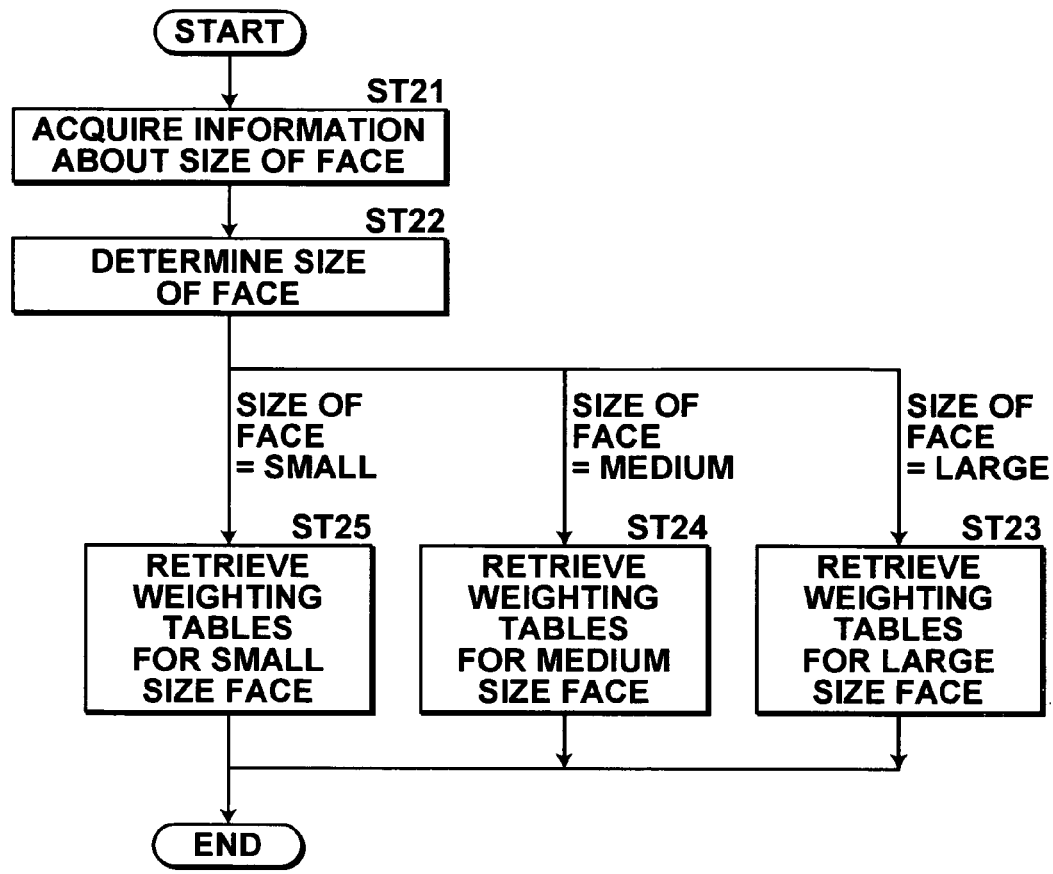
FIG. 5 is a flow chart of a process of selecting the weighting table.

FIG. 5 is a flow chart of a process of selecting the weighting tables. The evaluation value calculating unit 32 receives the information about the size of the face acquired by the information acquiring unit 30 (step ST21), and determines the size of the face (step ST22). If the size of the face=Large, then the weighting tables LUT1 and LUT11 for Large size faces are retrieved from the hard disk 24 (step ST23), and the process ends. If the size of the face=Medium, then the weighting tables LUT2 and LUT12 for Medium size faces are retrieved from the hard disk 24 (step ST24), and the process ends. If the size of the face=Small, then the weighting tables LUT3 and LUT13 for Small size faces are retrieved from the hard disk 24 (step ST25), and the process ends.

Subsequently, the evaluation value calculating unit 32 references the selected weighting tables to acquire weighting factors (step ST7). It should be noted that, since the two weighting tables for the x-direction and the y-direction are selected in the first embodiment, two weighting factors are acquired. Then, the weighting factors are summed up to yield a temporary evaluation value for the image (step ST8). The temporary evaluation value is added to a current evaluation value, and the resulting value is set as a new evaluation value (step ST9). Then, whether or not another face area is contained in the image to be processed is determined (step ST10). If the determination in step ST10 is negative, the process ends. If the determination in step ST10 is affirmative, the next face area is set to be processed (step ST11), and the process returns to step ST5 to repeat the operations in step ST5 and the following steps.

In a case where only one face area is contained in the image, the new evaluation value calculated in step ST9 is outputted as a final evaluation value. In a case where a plurality of face areas are contained in the image, the temporary evaluation values calculated for the face areas are summed up to yield the final evaluation value.

As described above, according to the first embodiment, the information about the size and the position of the face are acquired from the image, and the evaluation value representing the result of evaluation of the image is statistically calculated based on the information about the size and the position of the face. Thus, average viewers' taste can be reflected on the evaluation value, thereby allowing more accurate evaluation of images.

It should be noted that, in the above-described first embodiment, the information acquiring unit 30 acquires, as the information about the size of the face, the information classified into three different sizes including Large, Medium and Small. However, the number of pixels within the face area or the ratio of the face area to the entire image may be used as the information about the size of the face without further conversion. In this case, the evaluation value calculating unit 32 determines the size of the face (Large, Medium or Small) using the information about the size of the face and the threshold values Th1 and Th2 to select the weighting tables. Further, in this case, the weighting tables may be obtained by linear interpolation using the information about the size of the face. For example, if the size of the face is between the Large and the Medium sizes, linear interpolation may be applied between the weighting tables LUT1, LUT11 for the Large size faces and the weighting tables LUT2, LUT12 for the Medium size faces, respectively, to obtain new weighting tables. Then, the weighting factors are obtained from the new weighting tables.

Figure 6:
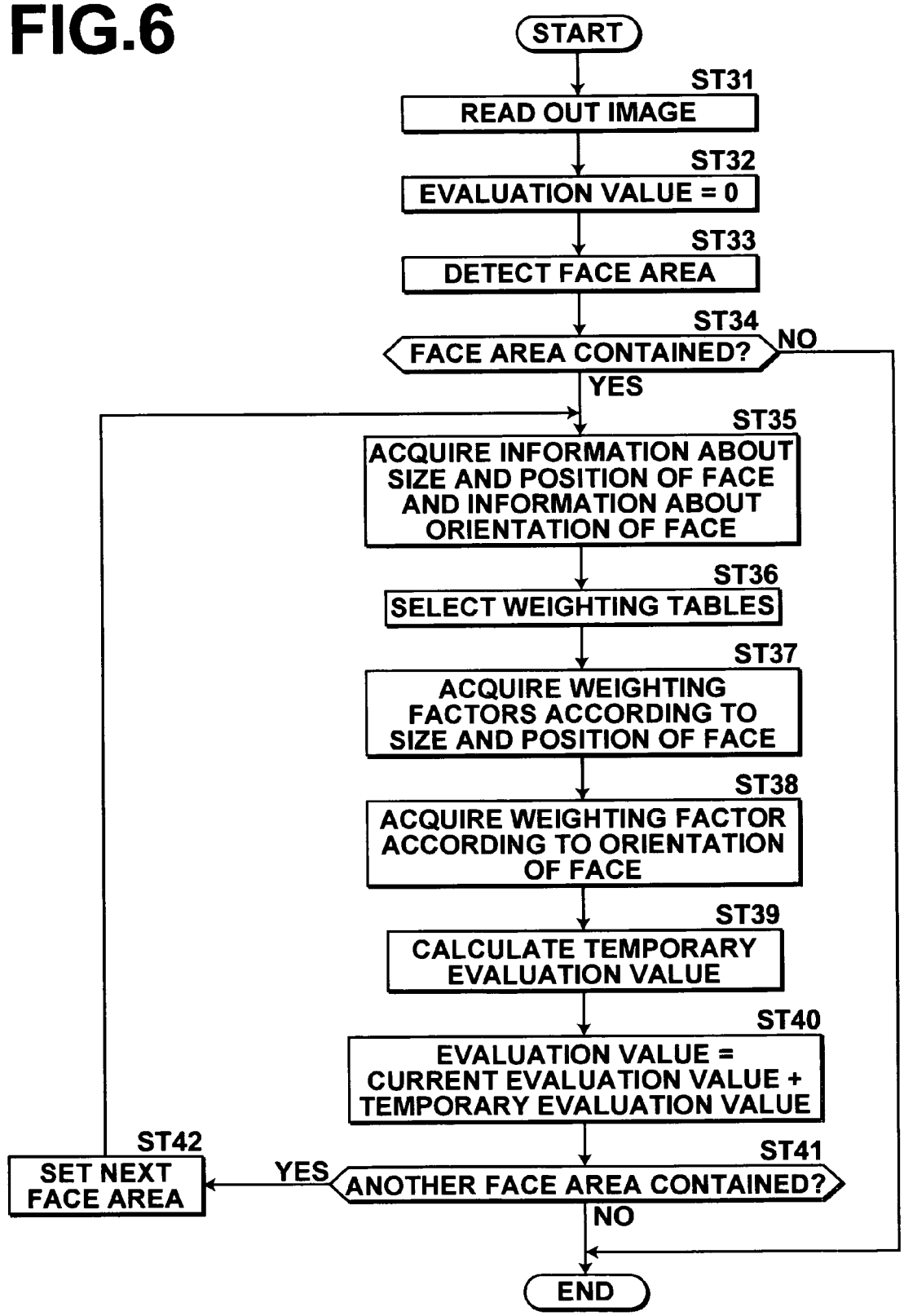
FIG. 6 is a flow chart of an image evaluation process carried out in a second embodiment of the invention.

Next, a second embodiment of the invention will be described. FIG. 6 is a flow chart of an image evaluation process carried out in the second embodiment of the invention. In addition to the information about the size and the position of face, information about the orientation of the face is used for calculating the evaluation value in the second embodiment. The CPU 12 starts the process when the user has inputted an instruction for starting evaluation of the images through the input unit 16. First, an image is read from the hard disk 24 (step ST31), and the initial value of 0 is set for the evaluation value (step ST32). Then, the information acquiring unit 30 detects a human face area in the image (step ST33).

Subsequently, the information acquiring unit 30 determines whether or not the image contains a face area (step ST34). If the determination in step ST34 is negative, the process ends. On the other hand, if the determination in step ST34 is affirmative, the information about the size and the position as well as the information about the orientation of the face of interest contained in the image are acquired from the detected face area (step ST35). The information about the orientation of the face refers to information representing whether the face area contains a frontal image or a profile image of the face. It should be noted that the orientation of the face may be determined by further detecting an eye or eyes from the detected face area. If the detected face are contains two eyes, the orientation of the face is frontal, and if the detected face area contains one eye, the orientation of the face is profile. Alternatively, a feature quantity representing the orientation of the face may be derived from the face area, and the orientation of the face may be determined using the feature quantity.

Then, the evaluation value calculating unit 32 selects weighting tables from the weighting tables LUT1 to LUT3 and LUT11 to LUT13 according to the size of the face of interest (step ST36). Then, the evaluation value calculating unit 32 references the selected weighting tables to acquire weighting factors according to the size and the position of the face (step ST37). It should be noted that, since the two weighting tables for x-direction and y-direction are selected in the second embodiment, two weighting factors are acquired.

Further, the evaluation value calculating unit 32 acquires a weighting factor according to the orientation of the face (step ST38). A function for obtaining the weighting factor according to the orientation of the face is stored in the hard disk 24. This function gives a weighting factor of 1 when the information about the orientation of the face indicates the frontal orientation, and a weighting factor of 0.5 when the information about the orientation of the face indicates the profile orientation.

The weighting factors according to the size and the position of the face are summed and the sum is multiplied by the weighting factor according to the orientation of the face to yield a temporary evaluation value for the image (step ST39). The temporary evaluation value is added to a current evaluation value, and the resulting value is set as a new evaluation value (step ST40). Then, whether or not another face area is contained in the image to be processed is determined (step ST41). If the determination in step ST41 is negative, the process ends. If the determination in step ST41 is affirmative, the next face area is set to be processed (step ST42), and the process returns to step ST35 to repeat the operations in step ST35 and the following steps.

In the case where only one face area is contained in the image, the new evaluation value calculated in step ST40 is outputted as the final evaluation value. In the case where a plurality of face areas are contained in the image, the temporary evaluation values calculated for the face areas are summed up to yield the final evaluation value.

As described above, according to the second embodiment, the information about the orientation of the face is used in addition to the first embodiment to calculate the evaluation value representing the result of evaluation of the image. Thus, average viewers' taste can be reflected on the evaluation value, thereby allowing more accurate evaluation of images.

It should be noted that, in the above-described second embodiment, the weighting factor according to the size and the position of the face is multiplied by the weighting factor according to the orientation of the face to yield the temporary evaluation value. However, the temporary evaluation value may be calculated by adding the weighting factor according to the orientation of the face to the weighting factor according to the size and the position of the face.

Figure 7:
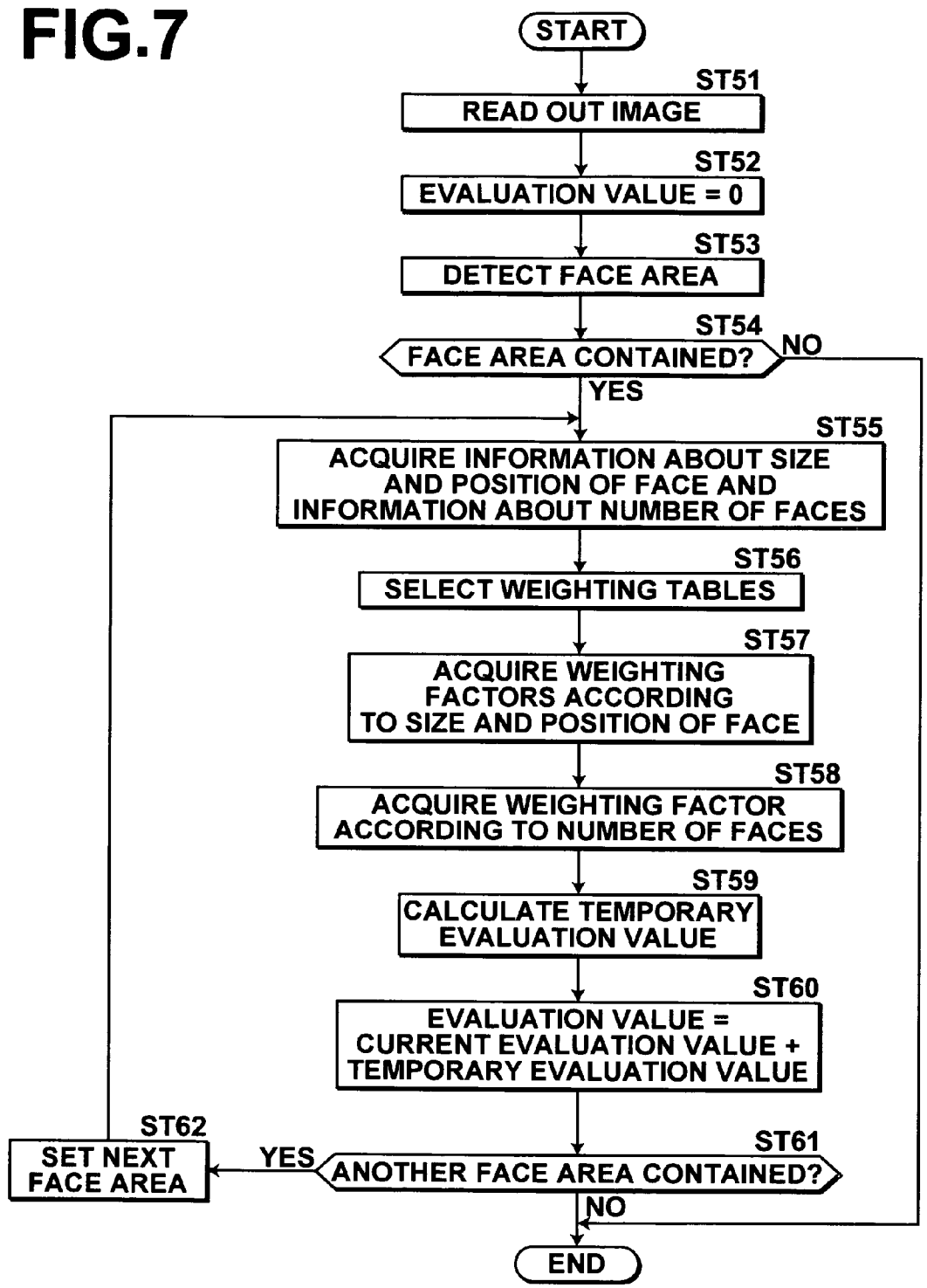
FIG. 7 is a flow chart of an image evaluation process carried out in a third embodiment of the invention.

Next, a third embodiment of the invention will be described. FIG. 7 is a flow chart of an image evaluation process carried out in the third embodiment of the invention. In addition to the information about the size and the position of the face, information about the number of faces contained in the image is used for calculating the evaluation value in the third embodiment. The CPU 12 starts the process when the user has inputted an instruction for starting evaluation of the images through the input unit 16. First, an image is read from the hard disk 24 (step ST51), and the initial value of 0 is set for the evaluation value (step ST52). Then, the information acquiring unit 30 detects a human face area in the image (step ST53).

Subsequently, the information acquiring unit 30 determines whether or not the image contains a face area (step ST54). If the determination in step ST54 is negative, the process ends. On the other hand, if the determination in step ST54 is affirmative, the information about the size and the position of the face of interest contained in the image as well as the information about the number of faces contained in the image are acquired from the detected face area (step ST55).

Then, the evaluation value calculating unit 32 selects weighting tables from the weighting tables LUT1 to LUT3 and LUT11 to LUT13 according to the size of the face of interest (step ST56). It should be noted that, in the third embodiment, another weighting table that is determined in advance according to the number of faces contained in the image is also selected.

Figure 8:
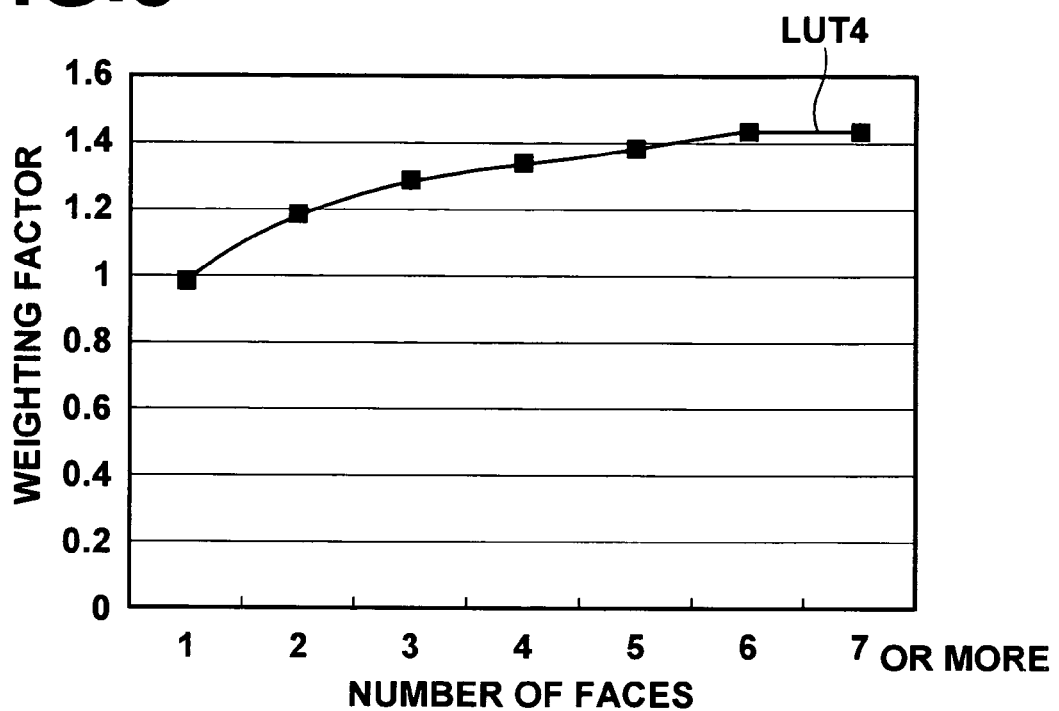
FIG. 8 illustrates a weighting table with respect to numbers of faces.

FIG. 8 illustrates the weighting table with respect to the number of faces. It should be noted that the weighting table LUT4 is determined based on a test where each of a number of evaluators selects sample images that are preferable to him or her from a lot of sample images containing various numbers of faces, and the weighting factors represent ratios of the numbers of evaluators who selected the respective sample images to the total number of evaluators. In the weighting table LUT4, the weighting factors are normalized by assigning the weighting factor of 1 to the sample image containing one face. Further, as shown in FIG. 8, in the weighting table LUT4, the numbers of faces are plotted along the abscissa axis and the weighting factors are plotted along the ordinate axis.

Then, the evaluation value calculating unit 32 references the selected weighting tables according to the size of the face to acquire weighting factors according to the size and the position of the face (step ST57). It should be noted that, since the two weighting tables for x-direction and y-direction are selected in the third embodiment, two weighting factors are acquired.

The evaluation value calculating unit 32 further references the weighting table LUT4 to acquire a weighting factor according to the number of faces contained in the image (step ST58).

Then, the weighting factors according to the size and the position of the face are summed and the sum is multiplied by the weighting factor according to the number of faces contained in the image to yield a temporary evaluation value for the image (step ST59). The temporary evaluation value is added to a current evaluation value, and the resulting value is set as a new evaluation value (step ST60). Then, whether or not another face area is contained in the image to be processed is determined (step ST61). If the determination in step ST61 is negative, the process ends. If the determination in step ST61 is affirmative, the next face area is set to be processed (step ST62), and the process returns to step ST55 to repeat the operations in step ST55 and the following steps.

In the case where only one face area is contained in the image, the new evaluation value calculated in step ST60 is outputted as the final evaluation value. In this case, since the weighting factor according to the number of faces contained in the image is 1, the calculated evaluation value is similar to those in the first and second embodiments. On the other hand, in the case where a plurality of face areas are contained in the image, the temporary evaluation values calculated for the face areas are summed up to yield the final evaluation value.

As described above, according to the third embodiment, the information about the number of faces contained in the image is used in addition to the first embodiment to calculate the evaluation value representing the result of evaluation of the image. Thus, average viewers' taste can be reflected on the evaluation value, thereby allowing more accurate evaluation of images.

It should be noted that, in the above-described third embodiment, the information about the orientation of the face used in the second embodiment may additionally be used to calculate the evaluation value representing the result of evaluation of the image. In this case, the temporary evaluation value may be calculated by summing up the two weighting factors according to the size and the position of the face, multiplying the sum by the weighting factor according to the number of faces contained in the image, and then multiplying the resulting value by the weighting factor according to the orientation of the face.

It should be noted that, although the temporary evaluation value is calculated by multiplying the weighting factor according to the size and the position of the face by the weighting factor according to the number of faces contained in the image in the above-described third embodiment, the temporary evaluation value may be calculated by adding the weighting factor according to the number of faces contained in the image to the weighting factor according to the size and the position of the face.

Figure 9:
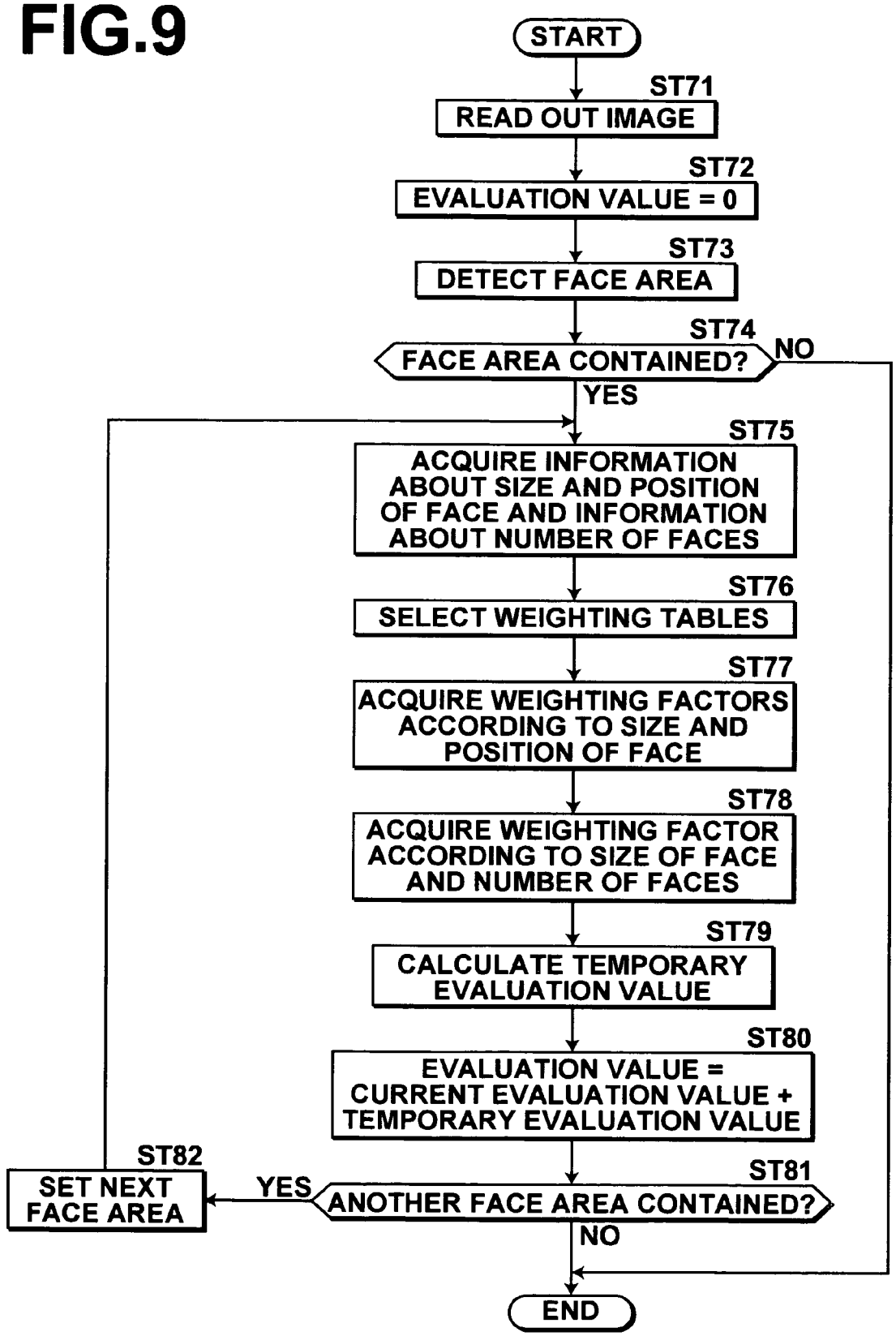
FIG. 9 is a flow chart of an image evaluation process carried out in a fourth embodiment of the invention.

Next, a fourth embodiment of the invention will be described. FIG. 9 is a flow chart of an image evaluation process carried out in the fourth embodiment of the invention. In addition to the weighting tables according to the size and the position of the face, weighting tables according to the size of the face of interest and the number of faces contained in the image are prepared, and the evaluation value is calculated using a weighting factor according to the size of the face of interest and the number of faces contained in the image in the fourth embodiment. The CPU 12 starts the process when the user has inputted an instruction for starting evaluation of the images through the input unit 16. First, an image is read from the hard disk 24 (step ST71), and the initial value of 0 is set for the evaluation value (step ST72). Then, the information acquiring unit 30 detects a human face area in the image (step ST73).

Subsequently, the information acquiring unit 30 determines whether or not the image contains a face area (step ST74). If the determination in step ST74 is negative, the process ends. On the other hand, if the determination in step ST74 is affirmative, the information about the size and the position of the face of interest contained in the image as well as the information about the number of faces contained in the image are acquired from the detected face area (step ST75).

Then, the evaluation value calculating unit 32 selects weighting tables from the weighting tables LUT1 to LUT3 and LUT11 to LUT13 according to the size of the face of interest (step ST76). It should be noted that, in the fourth embodiment, another weighting table is selected according to the size of the face of interest from weighting tables that have been determined in advance according to the size of the face of interest and the number of faces contained in the image.

Figure 10:
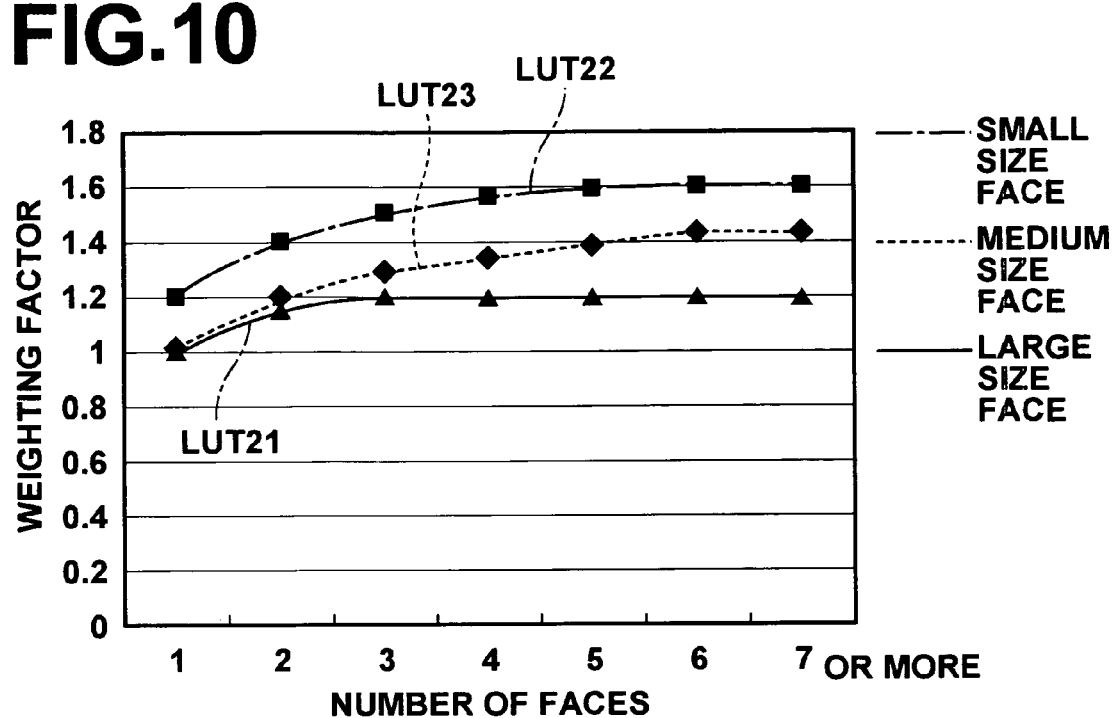
FIG. 10 illustrates weighting tables with respect to sizes and numbers of faces.

FIG. 10 illustrates the weighting tables with respect to the size of the face of interest and the number of faces contained in the image. It should be noted that the weighting tables LUT21 to LUT23 are determined based on a test where each of a number of evaluators selects sample images that are preferable to him or her from a lot of sample images containing faces of various sizes and numbers, and the weighting factors represent ratios of the numbers of evaluators who selected the respective sample images to the total number of evaluators. Further, in the weighting tables LUT21 to LUT23, the weighting factors are normalized by assigning the weighting factor of 1 to the image containing one face with the size of the face being Large or Medium, and assigning the weighting factor of 1.2 to the image containing one face with the size of the face being Small. As shown in FIG. 10, in the weighting tables LUT21 to LUT23, the numbers of faces contained in the image for each of the sizes of the face of interest (Large, Medium and Small) are plotted along the abscissa axis, and the weighting factors are plotted along the ordinate axis.

Then, the evaluation value calculating unit 32 references the selected weighting tables according to the size of the face of interest to acquire weighting factors according to the size and the position of the face of interest (step ST77). It should be noted that, since the two weighting tables for x-direction and y-direction are selected in the fourth embodiment, two weighting factors are acquired.

The evaluation value calculating unit 32 further references the selected weighting table with respect to the size of the face of interest and the number of faces contained in the image to acquire a weighting factor according to the size of the face of interest and the number of faces contained in the image (step ST78).

Then, the weighting factors according to the size and the position of the face of interest are summed and the sum is multiplied by the weighting factor according to the size of the face of interest and the number of faces contained in the image to yield a temporary evaluation value for the image (step ST79). The temporary evaluation value is added to a current evaluation value, and the resulting value is set as a new evaluation value (step ST80). Then, whether or not another face area is contained in the image to be processed is determined (step ST81). If the determination in step ST81 is negative, the process ends. If the determination in step ST81 is affirmative, the next face area is set to be processed (step ST82), and the process returns to step ST75 to repeat the operations in step ST75 and the following steps.

In the case where only one face area is contained in the image, the new evaluation value calculated in step ST80 is outputted as the final evaluation value. In this case, since the weighting factor according to the size of the face of interest and the number of faces contained in the image is 1, the calculated evaluation value is similar to those in the first to third embodiments. On the other hand, in the case where a plurality of face areas are contained in the image, the temporary evaluation values calculated for the face areas are summed up to yield the final evaluation value.

As described above, according to the fourth embodiment, the information about the size of the face of interest and the number of faces contained in the image is used in addition to the first embodiment to calculate the evaluation value representing the result of evaluation of the image. Thus, average viewers' taste can be reflected on the evaluation value, thereby allowing more accurate evaluation of images.

It should be noted that, in the above-described fourth embodiment, the information about the orientation of the face used in the second embodiment may additionally be used to calculate the evaluation value representing the result of evaluation of the image. In this case, the temporary evaluation value may be calculated by summing up the two weighting factors according to the size and the position of the face of interest, multiplying the sum by the weighting factor according to the size of the face of interest and the number of faces contained in the image, and then multiplying the resulting value by the weighting factor according to the orientation of the face.

It should be noted that, although the temporary evaluation value is calculated by multiplying the weighting factor according to the size and the position of the face with the weighting factor according to the size of the face of interest and the number of faces contained in the image in the fourth embodiment, the temporary evaluation value may be calculated by adding the weighting factor according to the size of the face of interest and the number of faces contained in the image to the weighting factor according to the size and the position of the face of interest.

Figure 11:
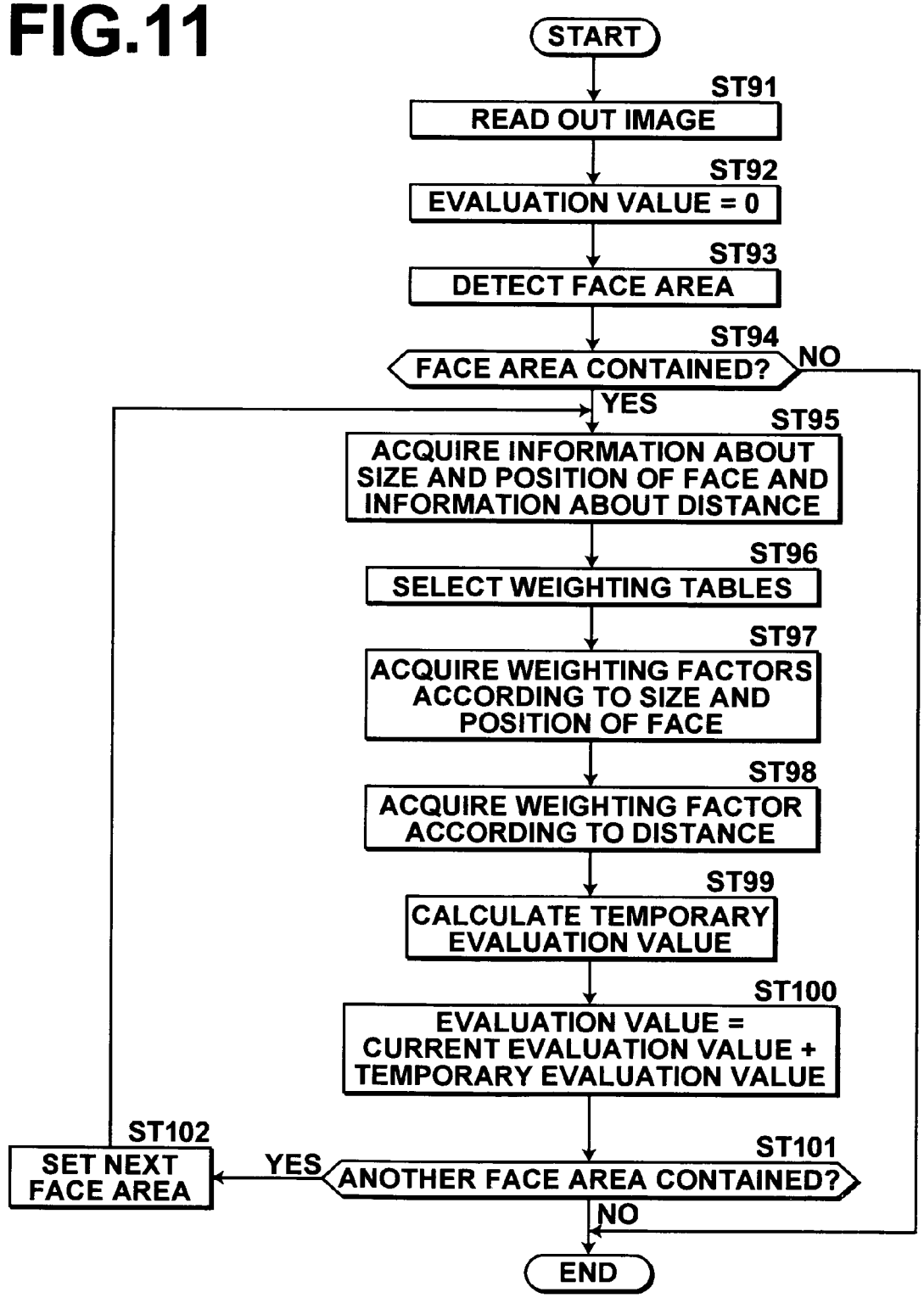
FIG. 11 is a flowchart of an image evaluation process carried out in a fifth embodiment of the invention.

Next, a fifth embodiment of the invention will be described. FIG. 11 is a flow chart of an image evaluation process carried out in the fifth embodiment of the invention. In addition to the information about the size and the position of the face of interest, information about the distance to the face of interest contained in the image from a face nearest to the center of the image is used to calculate the evaluation value in the fifth embodiment. The CPU 12 starts the process when the user has inputted an instruction for starting evaluation of the images through the input unit 16. First, an image is read from the hard disk 24 (step ST91), and the initial value of 0 is set for the evaluation value (step ST92). Then, the information acquiring unit 30 detects a human face area in the image (step ST93).

Subsequently, the information acquiring unit 30 determines whether or not the image contains a face area (step ST94). If the determination in step ST94 is negative, the process ends. If the determination in step ST94 is affirmative, the information about the size and the position of face of interest contained in the image as well as information about the distance to the face of interest contained in the image from the face nearest to the center of the image are acquired from the detected face area (step ST95).

Then, the evaluation value calculating unit 32 selects weighting tables from the weighting tables LUT1 to LUT3 and LUT11 to LUT13 according to the size of the face of interest (step ST96). It should be noted that, in the fifth embodiment, another weighting table that has been determined in advance according to the distance to the face of interest from the face nearest to the center of the image is also selected.

Figure 12:
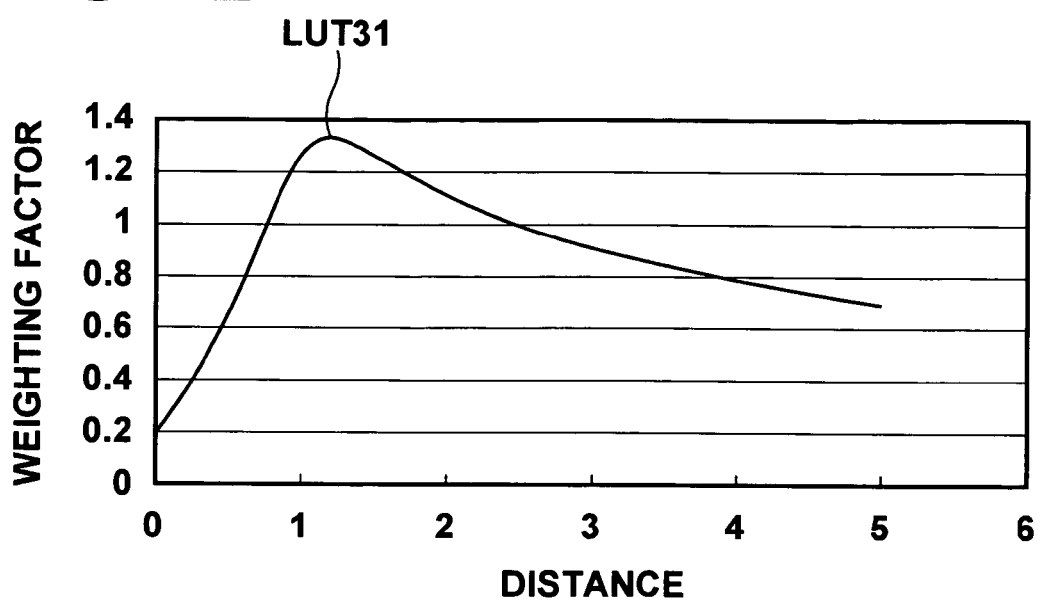
FIG. 12 illustrates a weighting table with respect to distances from a face nearest to the center.

FIG. 12 illustrates the weighting table with respect to the distance from the face nearest to the center. It should be noted that the weighting table LUT31 is determined based on a test where each of a number of evaluators selects sample images that are preferable to him or her from a lot of sample images containing faces at various positions in the image, and the weighting factors represent ratios of the numbers of evaluators who selected the respective sample images to the total number of evaluators. In the weighting table LUT31, the weighting factors are normalized by assigning the weighting factor of 1.25 to the image selected by the largest number of evaluators.

It should be noted that, in the weighting table LUT31, the distance values along the abscissa axis are normalized by setting the distance value of "1" to the distance equal to the size of the face nearest to the center, so that the weighting table with respect to the distance from the face nearest to the center can be determined without being influenced by the size of the face. Therefore, the same weighting factor is assigned to an image in which the size of the face nearest to the center is 3 cm and the distance from the face nearest to the center to the face of interest is 3 cm, and to an image in which the size of the face nearest to the center is 1 cm and the distance from the face nearest to the center to the face of interest is 1 cm.

Then, the evaluation value calculating unit 32 references the selected weighting tables according to the size of the face of interest to acquire weighting factors according to the size and the position of the face (step ST97). It should be noted that, since the two weighting tables for x-direction and y-direction are selected in the fifth embodiment, two weighting factors are acquired.

The evaluation value calculating unit 32 further references the weighting table LUT31 to acquire the weighting factor according to the distance from the face nearest to the center of the image (step ST98). It should be noted that, if only one face is contained in the image, the distance is 0 and the weighting factor corresponding to the distance is 0.2.

Then, the weighting factors according to the size and the position of the face of interest are summed and the sum is multiplied by the weighting factor according to the distance from the face nearest to the center to yield a temporary evaluation value for the image (step ST99). The temporary evaluation value is added to a current evaluation value, and the resulting value is set as a new evaluation value (step ST100). Then, whether or not another face area is contained in the image to be processed is determined (step ST101). If the determination in step ST101 is negative, the process ends. If the determination in step ST101 is affirmative, the next face area is set to be processed (step ST102), and the process returns to step ST95 to repeat the operations in step ST95 and the following steps.

In the case where only one face area is contained in the image, the new evaluation value calculated in step ST80 is outputted as the final evaluation value. In this case, since the weighting factor according to the distance from the face nearest to the center is 0.2, the calculated evaluation value is a value obtained by multiplying the evaluation value in the first to third embodiments by 0.2. On the other hand, in the case where a plurality of face areas are contained in the image, the temporary evaluation values calculated for the face areas are summed up to yield the final evaluation value.

As described above, according to the fifth embodiment, the information about the distance to the face of interest from the face nearest to the center of the image is used in addition to the first embodiment to calculate the evaluation value representing the result of evaluation of the image. Thus, average viewers' taste can be reflected on the evaluation value, thereby allowing more accurate evaluation of image.

It should be noted that, in the above-described fifth embodiment, the information about the orientation of the face used in the second embodiment may additionally be used to calculate the evaluation values representing the results of evaluation of the images. In this case, the temporary evaluation value may be calculated by summing up the two weighting factors according to the size and the position of the face of interest, multiplying the sum with the weighting factor according to the distance, and then multiplying the resulting value with the weighting factor according to the orientation of the face of interest.

Further, in the fifth embodiment, similarly to the third and fourth embodiments described above, the information about the number of faces contained in the image or the information about the size of the face of interest and the number of faces contained in the image may additionally be used to calculate the evaluation value. In this case, the temporary evaluation value may be calculated by summing up the two weighting factors according to the size and the position of the face of interest, multiplying the sum with the weighting factor according to the number of faces contained in the image or the weighting factor according to the size of the face of interest and the number of faces contained in the image, and then multiplying the resulting value with the weighting factor according to the distance. Further, in this case, the information about the orientation of the face may also be used to calculate the evaluation value.

It should be noted that, although the information about the size, position and orientation of the face of interest, number of faces contained in the image and distance to the face of interest from the face nearest to the center of the image, as well as combinations thereof are used to calculate the evaluation value for the image in the first to fifth embodiments, other information such as information about facial expression, lightness of the face, whether or not the eyes are open, and the like, may be used to calculate the evaluation value.

Figure 13:
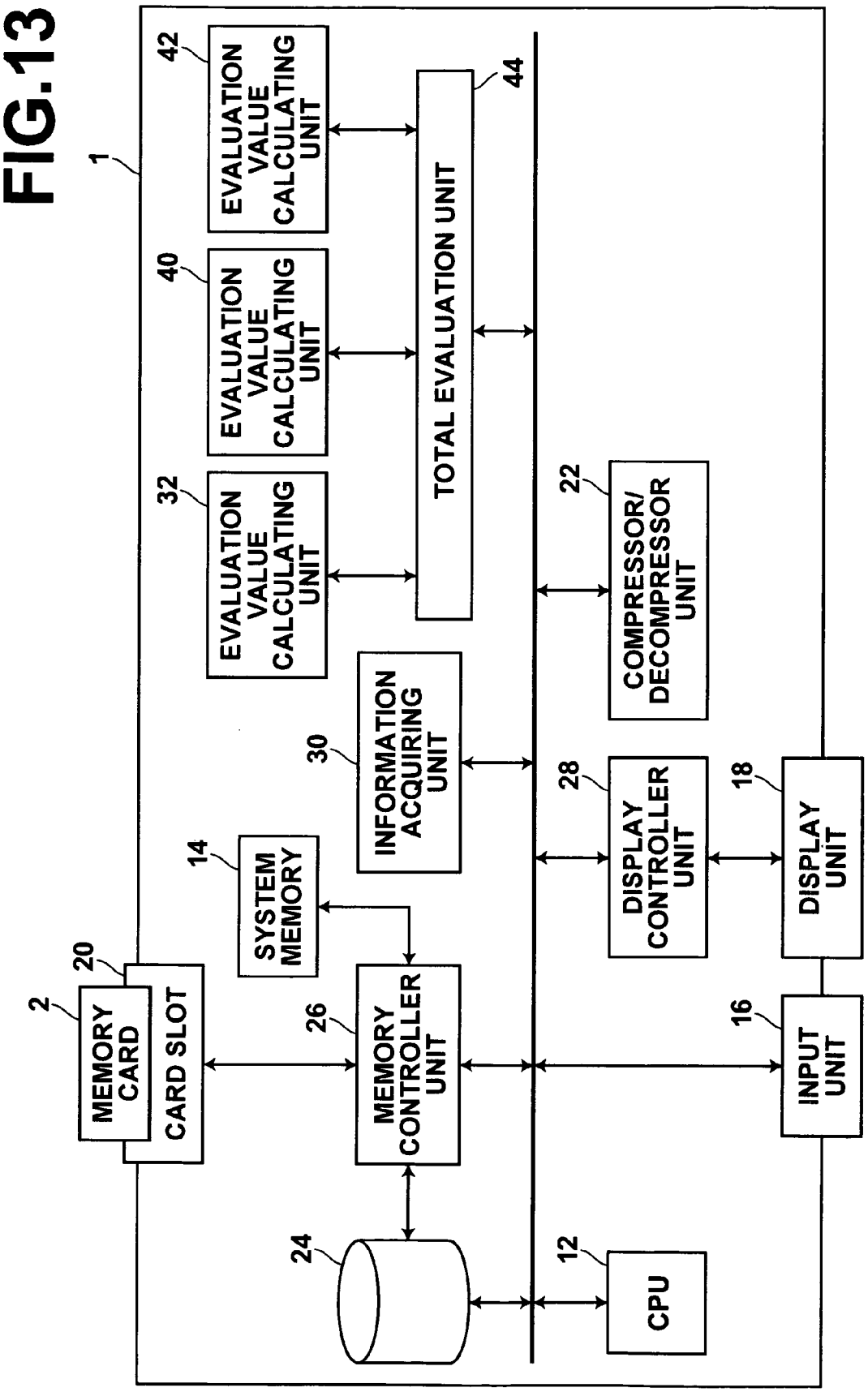
FIG. 13 is a schematic block diagram illustrating the configuration of the image evaluation device including a total evaluation unit.

In addition, as shown in FIG. 13, the image evaluation device 1 of the invention may further include a total evaluation unit 44, which calculates a total evaluation value for the image based on the evaluation value calculated by the evaluation value calculating unit 32 and other evaluation values calculated by a plurality of (two, in this example) evaluation value calculating units 40 and 42. It should be noted that the total evaluation unit 44 may calculate the total evaluation value by simply summing up the evaluation values calculated by the evaluation value calculating units 32, 40 and 42, or may calculate the total evaluation value as a weighted sum.

In the above description, the device 1 according to the embodiments of the invention has been described. The embodiments of the invention also includes a program for causing a computer to operate as means corresponding to the above-described information acquiring unit 30 and evaluation value calculating unit 32 to carry out the processes shown in FIGS. 2, 5, 6, 7, 9 and 11. The embodiments of the invention further include a computer readable storage medium storing the above-described program. In these cases, the weighting tables may be contained in the program or in the same storage medium as the program, or may be supplied from an external device or a separate medium.

According to the invention, from an image containing at least one face, the information about the size and the position of the face are acquired, and the evaluation value representing the result of evaluation of the image is statistically calculated based on the information about the size and the position of the face. Thus, average viewers' taste can be reflected on the evaluation value, thereby allowing more accurate evaluation of image.

Further, by selecting some of images from a plurality of images based on the evaluation values, more appropriate selection of images that reflects average viewers' taste can be accomplished.

Furthermore, by acquiring the information about the number of faces contained in the image and calculating the evaluation value based further on the information about the number of faces, more accurate evaluation of images can be accomplished.

Moreover, by acquiring the information about the distance to the face of interest contained in the image from the face nearest to the center of the image and calculating the evaluation value based further on the information about distance, more accurate evaluation of images can be accomplished.

In addition, by acquiring the information about the orientation of the face of interest and calculating the evaluation value based further on the information about the orientation of the face, more accurate evaluation of images can be accomplished.

What is claimed is:

1. An image evaluation device comprising:
   an information acquiring unit acquiring, from an image containing at least one face, information about the size and the position of a face of interest of the at least one face;
   an evaluation value calculating unit statistically calculating an evaluation value representing a result of evaluation of the image based on the information about the size and the position of the face of interest;
   the information acquiring unit acquiring information about a distance to the face of interest contained in the image from a face nearest to the center of the image, and
   the evaluation value calculating unit calculating the evaluation value based on the information about the distance.

2. The image evaluation device as claimed in claim 1, wherein
   the information acquiring unit acquiring information about a number of the at least one face, and
   the evaluation value calculating unit calculating the evaluation value based on the information about the number of the at least one face.

3. The image evaluation device as claimed in claim 1, wherein
   the information acquiring unit acquiring information about the orientation of the face of interest, and
   the evaluation value calculating unit calculating the evaluation value based on the information about the orientation of the face of interest.

4. The image evaluation device as claimed in claim 2, wherein
   the information acquiring unit acquiring information about the orientation of the face of interest, and
   the evaluation value calculating unit calculating the evaluation value based on the information about the orientation of the face of interest.

5. The image evaluation device as claimed in claim 1 wherein
   the information acquiring unit acquiring information about the orientation of the face of interest, and
   the evaluation value calculating unit calculating the evaluation value based on the information about the orientation of the face of interest.

6. An image evaluation method comprising the steps of:
   acquiring by an information acquiring unit of an image evaluation device, from an image containing at least one face, information about the size and the position of a face of interest of the at least one face;
   statistically calculating by an evaluation value calculating unit an evaluation value representing a result of evaluation of the image based on the information about the size and the position of the face of interest;
   the information acquiring unit acquiring information about a distance to the face of interest contained in the image from a face nearest to the center of the image, and
   the evaluation value calculating unit calculating the evaluation value based on the information about the distance.

* * * * *